US008424579B2

(12) United States Patent
Yoshikawa

(10) Patent No.: US 8,424,579 B2

(45) Date of Patent: Apr. 23, 2013

(54) PNEUMATIC TIRE WITH SIDE WALL WHITE RUBBER AND BEAD FILLER SOFT RUBBER PORTION

(75) Inventor: Makoto Yoshikawa, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 654 days.

(21) Appl. No.: 12/555,937

(22) Filed: Sep. 9, 2009

(65) Prior Publication Data

US 2010/0116401 A1 May 13, 2010

(30) Foreign Application Priority Data

Nov. 11, 2008 (JP) ................................ 2008-289002

(51) Int. Cl.
*B60C 13/04* (2006.01)
*B60C 15/06* (2006.01)

(52) U.S. Cl.
USPC ........... 152/524; 152/455; 152/541; 152/546; 152/547; 152/DIG. 12; 156/116

(58) Field of Classification Search .................. 152/524, 152/541, DIG. 12, 546, 547, 523, 525, 539, 152/455, 456; 156/116
See application file for complete search history.

(56) References Cited

U.S. PATENT DOCUMENTS 2,700,997 A * 2/1955 Morrissey et al. ........ 152/524 X
2,963,326 A * 12/1960 Wood ........................ 152/524 X
2,977,151 A * 3/1961 Ford, Jr. .................... 152/524 X
3,114,650 A * 12/1963 Oppenheim et al. .......... 152/524
3,128,815 A * 4/1964 Nonnamaker ................ 152/524
3,164,192 A * 1/1965 Kasio et al. ............... 156/116 X
3,382,120 A * 5/1968 Rudder ......................... 156/116
3,449,201 A * 6/1969 Nelson et al. ............. 152/524 X
3,612,137 A * 10/1971 Guyot ....................... 152/541 X
4,842,033 A * 6/1989 Nguyen ........................ 152/541
6,135,182 A * 10/2000 Nagai ....................... 152/547 X
6,223,797 B1 * 5/2001 Shida et al. ............... 152/541 X (Continued)

FOREIGN PATENT DOCUMENTS

JP 03248903 A * 11/1991 .................... 152/541
JP 03268932 A * 11/1991 .................... 152/541

(Continued)

OTHER PUBLICATIONS

Webster's Third New International Dictionary, Unabridged, Merriam-Webster Inc., 1993, online definition of "constrict".*

(Continued)

*Primary Examiner* — Adrienne C Johnstone
(74) *Attorney, Agent, or Firm* — Fish & Richardson P.C.

(57) ABSTRACT

A pneumatic tire has an annular bead core, a bead filler, a carcass ply rolled up in such a manner as to pinch the bead core and the bead filler, and a white rubber arranged in an outer side of the carcass ply of the side wall portion. The white rubber has an inner peripheral end positioned in an outer side of the bead filler. The bead filler has a main body rubber portion running into the bead core from a leading end, and a soft rubber portion constructing a part of an outer surface of the bead filler and positioned in an inner side of the inner peripheral end of the white rubber. The soft rubber portion is harder than the white rubber and softer than the main body rubber portion.

7 Claims, 2 Drawing Sheets

5 4a 10 2 4 22b 4b 11 1b T2 21 22 L1 L2 22a 11a 9 1a 1

U.S. PATENT DOCUMENTS

| | | | | |
|---|---|---|---|---|
| 6,374,888 | B1 * | 4/2002 | Willard et al. | 152/541 X |
| 6,651,715 | B2 * | 11/2003 | Kato | 152/547 X |
| 6,834,699 | B2 * | 12/2004 | Corsi | 152/547 X |
| 7,819,155 | B2 * | 10/2010 | Ishida | 152/547 X |
| 2008/0093001 | A1 * | 4/2008 | Ono | |
| 2008/0314494 | A1 * | 12/2008 | Ohsumimoto | |

FOREIGN PATENT DOCUMENTS

| | | | | |
|---|---|---|---|---|
| JP | 04274910 | A | * | 9/1992 |
| JP | 05-16618 | | | 1/1993 |
| JP | 08-175129 | | | 7/1996 |
| JP | 09-111041 | | | 4/1997 |
| JP | 10-29413 | | | 2/1998 |
| JP | 2005280610 | A | * | 10/2005 |
| JP | 2006096178 | A | * | 4/2006 |
| JP | 2008-1742 | | | 1/2008 |

OTHER PUBLICATIONS

Webster's Third New International Dictionary, Unabridged, Merriam-Webster Inc., 1993, online definition of "triangle".*

* cited by examiner

PNEUMATIC TIRE WITH SIDE WALL WHITE RUBBER AND BEAD FILLER SOFT RUBBER PORTION

BACKGROUND OF THE INVENTION

1. Field of the Invention

The present invention relates to a pneumatic tire in which a white rubber is arranged in a side wall portion.

2. Description of the Related Art

Conventionally, in a tire which is mainly used in a high load vehicle such as a recreational vehicle (RV) or a light truck (LT) or the like, there has been known a pneumatic radial tire in which various white patterns are formed by a white rubber which is arranged in a side wall portion, and a fashion characteristic is enhanced (for example, refer to Japanese Unexamined Patent Publication Nos. 9-111041 and 2008-1742). The white rubber is generally arranged in a region which is closer to a bead portion than a tire maximum width position at which a deflection at a time of traveling is great.

The white rubber cannot employ a carbon black having a high reinforcing characteristic for holding the white color, and is accordingly softer and lower in rigidity than a normal rubber constructing the bead portion and the side wall portion. Therefore, a strain generated near the bead portion due to repeated compression and tension at a time of traveling tends to be concentrated on an interface between the white rubber and a rubber jointed thereto, and causes a separation of a roll-up ply, and there is a risk of running into a malfunction.

As a method of absorbing the strain mentioned above, there can be considered to stick a rubber reinforcing tape to the roll-up ply. However, according to this method, since there is a tendency that a member thickness corresponding to the stuck reinforcing tape is increased and a heat generation characteristic rises up, there is a problem that a durability is lowered under a high-speed traveling condition in which an amount of heat generation near the bead portion rises.

In Japanese Unexamined Patent Publication Nos. 5-16618, 8-175129, and 10-29413, there is described a pneumatic tire in which a bead filler is divided into two or three sections in a diametrical direction, and a rubber in an outer peripheral side is made softer than a rubber in an inner peripheral side. However, since these tires accompany a low rigidity of the side wall portion caused by a significant reduction in hardness of the bead filler, it is not possible to sufficiently suppress a heat generation rise caused by a standing wave in a high speed region, and there is a risk that a deterioration of high-speed durability is caused. Further, there is a risk that a handling performance is lowered by the low rigidity of the side wall portion. As a matter of course, these structures are not provided on the assumption of the structure in which the white rubber is arranged in the side wall portion.

SUMMARY OF THE INVENTION

Accordingly, an object of the present invention is to provide a pneumatic tire which can achieve excellent durability and handling performance while arranging a white rubber in a side wall portion.

The object can be achieved by the following present invention. That is, the present invention provides a pneumatic tire comprising an annular bead core provided in a bead portion, a bead filler provided in an outer side in a tire diametrical direction of the bead core, a carcass ply rolled up in such a manner as to pinch the bead core and the bead filler, and a white rubber arranged in an outer side of the carcass ply of the side wall portion, and having an inner peripheral end positioned in an axially outer side of the bead filler, wherein the bead filler has a main body rubber portion running into the bead core from a leading end, and a soft rubber portion constructing a part of an axially outer surface of the bead filler and positioned in an axially inner side of the inner peripheral end of the white rubber, and the soft rubber portion is harder than the white rubber and softer than the main body rubber portion.

In the pneumatic tire according to the present invention, since the bead filler has the soft rubber portion as mentioned above, it is possible to absorb the strain which tends to be concentrated on the interface between the inner peripheral end of the white rubber and the rubber jointed thereto, and it is possible to inhibit the separation from being generated so as to enhance the durability (the general durability). Further, since the main body rubber portion from the leading end of the bead filler to the bead core is comparatively hard, it is possible to suppress the heat generation rise caused by the standing wave at the high speed region so as to enhance the durability (the high speed durability), and it is possible to secure the rigidity of the side wall portion so as to achieve the excellent handling performance.

In the above structure, it is preferable that a ratio of a cross sectional height of the soft rubber portion with respect to the bead filler is between 30 and 50%. It is possible to secure the cross sectional height of the soft rubber portion so as to effectively achieve the absorbing action of the strain by making this ratio equal to or more than 30%, whereby it is possible to more securely enhance the general durability. Further, it is possible to secure the volume of the main body rubber portion by making the ratio equal to or less than 50%, whereby it is possible to more securely enhance the high-speed durability and the handling performance. The cross sectional heights of the bead filler and the soft rubber portion can be measured in the tire meridian cross section.

In the above structure, it is preferable that a ratio of a cross sectional area of the soft rubber portion with respect to the bead filler is less than 30%. It is possible to secure the ratio occupied by the main body rubber portion with respect to the bead filler by making the ratio less than 30%, whereby it is possible to more securely enhance the high-speed durability and the handling performance. The cross sectional areas of the bead filler and the soft rubber portion can be measured in the tire meridian cross section.

DETAILED DESCRIPTION OF THE PREFERRED EMBODIMENTS

Figure 1:
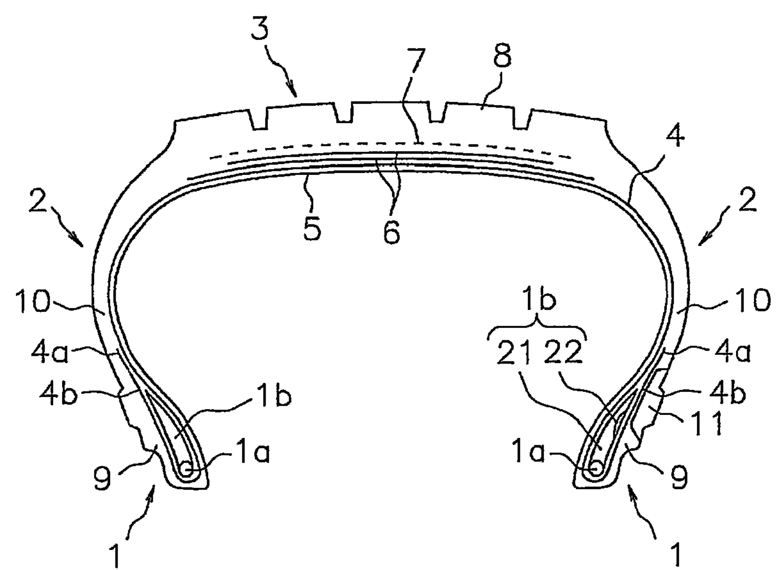
FIG. 1 is a tire meridian cross sectional view schematically showing one example of a pneumatic tire according to the present invention.
Figure 2:
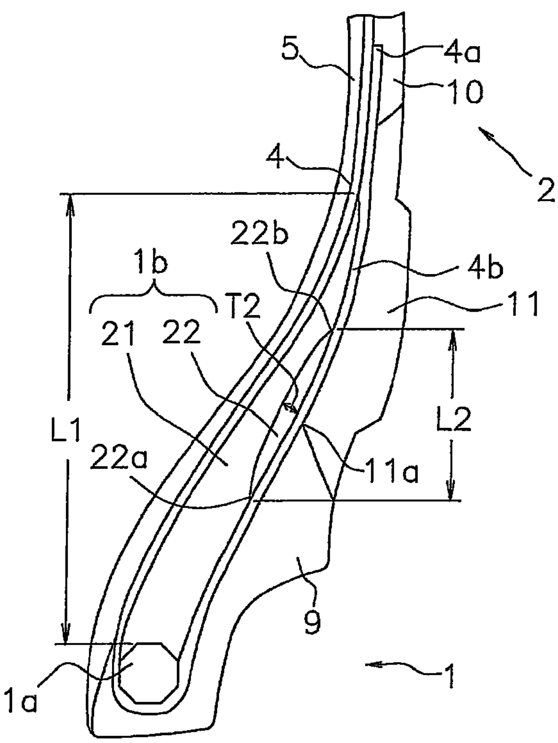
FIG. 2 is a substantial part cross sectional view showing a substantial part of the pneumatic tire in FIG. 1 in an enlarged manner.

An embodiment of the present invention will be explained with reference to the drawings. FIG. 1 is a tire meridian cross sectional view schematically showing one example of a pneumatic tire according to the present invention. FIG. 2 is a substantial part cross sectional view showing a substantial part of the pneumatic tire in FIG. 1 in an enlarged manner.

The pneumatic tire is a radial tire which is provided with a pair of bead portions 1, side wall portions 2 extending from the bead portions 1 to outer side in a tire diametrical direction, a tread portion 3 connected to outer peripheral ends of the side wall portions 2, and a carcass ply 4 arranged in such a manner as to be bridged between a pair of bead portions 1. In the present embodiment, there is shown an example in which one carcass ply 4 is arranged, however, a plurality of carcass plies may be laminated and arranged in the present invention.

In the bead portion 1, an annular bead core 1*a* formed by coating a convergence body of steel wire with rubber, and a bead filler 1*b* disposed outside of the bead core 1*a* in the diametrical direction of the tire. The bead filler 1*b* is mainly constructed by a hard rubber extending in a tire diametrical direction and having a triangular cross-sectional shape formed by an axially outer surface, an axially inner surface, and a radially inner surface, however, it is partly constructed by a comparatively soft rubber as mentioned below in the present invention.

The carcass ply 4 is rolled up in such a manner as to pinch the bead core 1*a* and the bead filler 1*b*, and an end portion 4*a* thereof is locked. Hereinafter, there is a case that the portion which is rolled up from an inner side to an outer side is called a roll-up ply 4*b*. In the present embodiment, the end portion 4*a* of the carcass ply 4 is positioned in an outer side in the tire diametrical direction than a leading end (an outer peripheral end) of the bead filler 1*b* such that the end portion 4*a* is in contact with the carcass ply 4, however, the present invention is not limited thereto, but the end portion 4*a* may be locked at a position which is adjacent to the outer side surface of the bead filler 1*b*.

An inner liner 5 for maintaining air pressure is disposed on the inner side of the carcass ply 4. Further, a belt layer 6 and a belt reinforcing layer 7 are arranged in an outer side of the carcass ply 4 in the tread portion 3, and a tread rubber 8 is arranged further in an outer side thereof. A rim protector 9 coming into contact with a rim flange at a time of installing to a vehicle is arranged in an outer side of the roll-up ply 4*b* in the bead portion 1. A rubber hardness (a rubber hardness measured according to a durometer hardness test (type A) of JISK6253, same as the following) of a rim protector 9 is, for example, between 65 and 75°.

A side wall rubber 10 is provided in an outer side of the carcass ply 4 in the side wall portion 2, however, in the pneumatic tire according to the present invention, a white rubber 11 is arranged in a region which is near the bead portion 1 in the side wall portion 2 in order to enhance a fashion characteristic. The white rubber 11 is not necessarily arranged in the side wall portions 2 in both sides, and is arranged only in a side (a right side in FIG. 1) corresponding to a vehicle outer side at a time of being installed to the vehicle, in the present embodiment.

An inner peripheral end 11*a* of the white rubber 11 is positioned in an outer side in a tire width direction of the bead filler 1*b*, and the white rubber 11 is jointed to the rim protector 9. In the case where the end portion of the white rubber 11 is inclined as in the present embodiment, the inner peripheral end 11*a* is defined by an inner side surface of the white rubber 11 as shown in FIG. 2. There is a case that the white rubber 11 is expressed as a letter of a character or the like by coating an outer side surface of the white rubber 11 with a thin black cover rubber, and partly grinding the cover rubber.

A rubber composition for forming the white rubber 11 is known, and the conventionally known rubber composition can be used in the present invention without being particularly limited. The carbon black is not used as the reinforcing material in the white rubber 11, for example, a metal oxide such as an alumina, a magnesia, a silica or the like is substituted. The white rubber 11 is softer than the rim protector 9 and the side wall rubber 10, and a rubber hardness thereof is exemplified by 45 to 72°.

The bead filler 1*b* has a main body rubber portion 21 running into the bead core 1*a* from the leading end, and a soft rubber portion 22 constructing a part of the outer side surface of the bead filler 1*b*, and positioned in an inner side of the inner peripheral end 11*a* of the white rubber 11, and the soft rubber portion 22 is harder than the white rubber 11 and softer than the main body rubber portion 21. The inner peripheral end 11*a* of the white rubber 11 is arranged approximately in the center of a cross sectional height of the soft rubber portion 22, an inner peripheral end 22*a* of the soft rubber portion 22 is positioned in an inner side in the tire diametrical direction than the inner peripheral end 11*a*, and an outer peripheral end 22*b* is positioned in an outer side in the tire diametrical direction than the inner peripheral end 11*a*.

In a peripheral region of the inner peripheral end 11*a* of the white rubber 11, there is a tendency that the strain generated by the repeated compression and tension at a time of traveling is concentrated on the interface between the white rubber 11 and the rim protector 9, due to a hardness difference between them. However, according to the tire structure mentioned above, since the soft rubber portion 22 can have charge of the strain so as to disperse, it is possible to inhibit the separation from being generated so as to improve the durability. Further, since the main body of the bead filler 1*b* is constructed by the comparatively hard main body rubber portion 21, it is possible to achieve an excellent handling characteristic without deteriorating the rigidity of the side wall portion 2 as well as it is possible to suppress the heat generation rise caused by the standing wave at the high speed region so as to enhance the high-speed durability.

The rubber hardness of the main body rubber portion 21 is preferably between 75 and 95°, and more preferably between 85 and 95°. On the other hand, the rubber hardness of the soft rubber portion 22 is preferably between 50 and 60°, and more preferably between 55 and 60°. The rubber hardness difference between the main body rubber portion 21 and the soft rubber portion 22 is preferably equal to or more than 20° in the light of effectively achieving the operations and effects mentioned above. If the rubber hardness difference is less than 20°, there is a tendency that the absorbing action of the strain by the soft rubber portion 22 or the suppressing action of the heat generation rise by the main body rubber portion 21 becomes small.

The main body rubber portion 21 runs into the bead core 1*a* from the leading end of the bead filler 1*b* as mentioned above, and the soft rubber portion 22 constructs a part of the thickness of the bead filler 1*b* in the arranged region. In other words, the bead filler 1*b* consists of a radially innermost part made only of the main body rubber portion 21, a radially outermost part made only of the main body rubber portion 21, and a center part made of the combination of the main body rubber portion 21 and the soft rubber portion 22, and in the center part the main body rubber portion 21 is locally constricted approximately in the center of the outer side surface, the soft rubber portion 22 is provided in the constricted region, and the bead filler 1*b* is formed into a triangular cross-sectional shape as a whole.

Accordingly, since it is possible to make the thickness of the bead filler 1*b* equal to that of the conventional bead filler which does not have the soft rubber portion 22, and therefore it is not necessary to accompany the increase of the member thickness, it is possible to inhibit the heat generation characteristic from being increased so as to secure the high-speed durability. In the light of well achieving the absorbing action of the strain by the soft rubber portion 22 and the suppressing action of the heat generation rise by the main body rubber portion 21, it is preferable that a rate of a thickness T2 of the soft rubber portion 22 with respect to the bead filler 1*b* is between 20 and 40%, at a position at which the soft rubber portion 22 has the maximum thickness.

A ratio L2/L1 of the cross sectional height of the soft rubber portion 22 with respect to the bead filler 1*b* is preferably between 30 and 50%, and more preferably between 35 and 45%. Accordingly, it is possible to effectively achieve the suppressing action of the heat generation rise by the main body rubber portion 21 so as to enhance the high-speed durability and the handling characteristic, as well as it is possible to effectively achieve the absorbing action of the strain by the soft rubber portion 22 so as to enhance the general durability.

It is preferable that the ratio of the cross sectional area of the soft rubber portion 22 with respect to the bead filler 1*b* is less than 30%, whereby it is possible to secure the ratio occupied by the main body rubber portion 21 with respect to the bead filler 1*b* so as to more securely enhance the high-speed durability and the handling characteristic. Further, it is preferable that the ratio of the cross sectional area is equal to or more than 15%, whereby it is possible to secure the volume of the soft rubber portion 22 so as to effectively achieve the absorbing action of the strain.

The pneumatic tire according to the present invention is the same as the normal tire except the structure relating to the bead portion and the white rubber arranged in the side wall portion, and the conventional known material, shape, structure, manufacturing method and the like can be employed in the present invention.

The present invention is useful as a pneumatic tire (a high load pneumatic tire) used in a high load vehicle such as the RV, the LT and the like in which the white rubber is frequently arranged in the side wall portion.

EXAMPLE

An example tire which concretely shows the structure and effect of the present invention will be explained. An evaluation of each of performances is executed as follows.

(1) General Durability

A general performance test was carried out in accordance with a method prescribed in JISD4230. In the case where such a malfunction as a separation or the like is not recognized even after the end of a test stage 3, load is continuously given to the tire, and the driving distance until the malfunction is recognized were measured.

(2) High Speed Durability

A high speed performance test A was carried out in accordance with a method prescribed in JISD4230. In the case where such a malfunction as a separation or the like is not recognized even after the end of a test stage 6, the speed is continuously given to the tire (per 10 minutes), and the speed and the time until the malfunction is recognized were measured.

(3) Handling Characteristic and Ride Comfort

These were evaluated by feeling based on an actual car, and were evaluated by three stages ○, Δ and x in the order of better.

Figure 3:
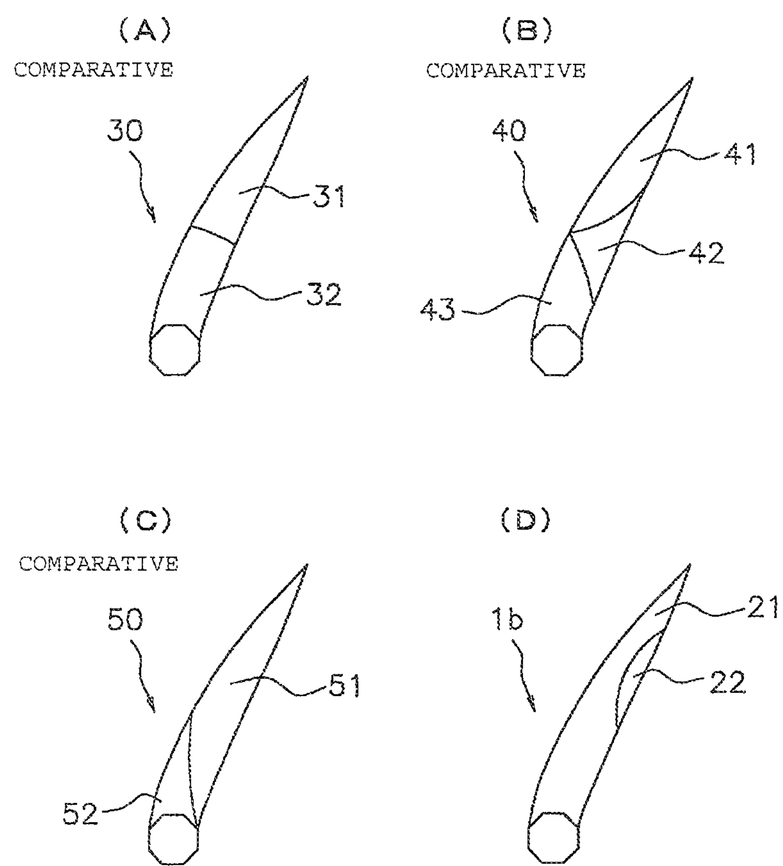
FIGS. 3A to 3D are cross sectional views schematically showing bead fillers according to the comparative examples 1 to 3 and the example.

Comparative examples 1 to 3 and an example are all constructed by a pneumatic tire (tire size P265/70R17) in which the white rubber is arranged in the side wall portion as shown in FIGS. 1 and 2, and have the same tire structure except the bead filler. FIGS. 3A to 3D are cross sectional views schematically showing the bead fillers according to the comparative examples 1 to 3 and the example, in which FIG. 3A shows the comparative example 1, FIG. 3B shows the comparative example 2, FIG. 3C shows the comparative example 3, and FIG. 3D shows the example. In each of the examples, the rubber hardness of the white rubber was set to 45°, and the rubber hardness of the rim protector was set to 70°.

In the comparative example 1, the bead filler 30 was divided into two in the tire diametrical direction, the rubber hardness of the outer peripheral side rubber 31 was set to 50°, the rubber hardness of the inner peripheral side rubber 32 was set to 65°, and the inner peripheral end of the white rubber was arranged in the outer side of the outer peripheral side rubber 31. In the comparative example 2, the bead filler 40 was divided into three in the tire diametrical direction, the rubber hardness of the outer peripheral side rubber 41 was set to 55°, the rubber hardness of the intermediate rubber 42 was set to 60°, the rubber hardness of the inner peripheral side rubber 43 was set to 90°, and the inner peripheral end of the white rubber was arranged in the outer side of the intermediate rubber 42.

In the comparative example 3, the bead filler 50 was divided into two in the tire diametrical direction, the outer peripheral side rubber 51 was formed by a foam rubber including a short fiber, the rubber hardness of the outer peripheral side rubber 51 was set to 35°, the rubber hardness of the inner peripheral side rubber 52 was set to 90°, and the inner peripheral end of the white rubber was arranged in the outer side of the outer peripheral side rubber 51. In the example, the bead filler 1*b* was structured such as to have the main body rubber portion 21 and the soft rubber portion 22 as mentioned above, the rubber hardness of the main body rubber portion 21 was set to 90°, the rubber hardness of the soft rubber portion 22 was set to 50°, the rate of the cross sectional height was set to 40%, and the rate of the cross sectional area is set to 25%. Results of the evaluation are shown in Table 1.

TABLE 1

| | Safety | | | |
|---|---|---|---|---|
| | General durability | High-speed durability | Handling characteristic | Ride comfort |
| Comparative example 1 | 8600 km | 210 km/h-5 min | X | ○ |
| Comparative example 2 | 7800 km | 220 km/h-1 min | Δ | Δ |
| Comparative example 3 | 8900 km | 210 km/h-9 min | X | ○ |
| Example | 8100 km | 230 km/h-2 min | ○ | Δ |

From Table 1, in the example, it is known that it is possible to achieve the excellent high-speed durability and handling characteristic without greatly lowering the general durability and the ride comfort, in comparison with the comparative examples 1 to 3. In the comparative examples 1 to 3, it is considered that the high-speed durability and the handling characteristic become lower by accompanying the low rigidity of the side wall portion caused by the significant reduction in hardness of the bead filler.

What is claimed is:

1. A pneumatic tire comprising:

an annular bead core provided in a bead portion;

a bead filler provided in an outer side in a tire diametrical direction of the bead core and having a triangular cross-sectional shape as a whole formed by an axially outer surface, an axially inner surface, and a radially inner surface;

a carcass ply rolled up in such a manner as to pinch the bead core and the bead filler; and a white rubber arranged in an outer side of the carcass ply of the side wall portion, and having an inner peripheral end positioned in an axially outer side of the bead filler, wherein the bead filler has a main body rubber portion running into the bead core from a leading end, and a soft rubber portion constructing part of the axially outer surface of the bead filler and positioned in an axially inner side of the inner peripheral end of the white rubber, and the soft rubber portion is harder than the white rubber and softer than the main body rubber portion, the bead filler consisting of a radially innermost part made only of the main body rubber portion, a radially outermost part made only of the main body rubber portion, and a center part made of the combination of the main body rubber portion and the soft rubber portion, and wherein in the center part the main body rubber portion is constricted at a constricted region at the center of the outer side surface of the main body rubber portion, and the soft rubber portion is provided in the constricted region.

2. The pneumatic tire according to claim 1, wherein a ratio of a cross sectional height of the soft rubber portion with respect to the bead filler is between 30 and 50%.

3. The pneumatic tire according to claim 1, wherein a ratio of a cross sectional area of the soft rubber portion with respect to the bead filler is less than 30%.

4. The pneumatic tire according to claim 3, wherein the ratio of the cross sectional area of the soft rubber portion with respect to the bead filler is 15% or more, and is less than 30%.

5. The pneumatic tire according to claim 1, wherein a rubber hardness of the main body rubber portion is between 75 and 95°, and a rubber hardness of the soft rubber portion is between 50 and 60°.

6. The pneumatic tire according to claim 1, wherein a rubber hardness difference between the main body rubber portion and the soft rubber portion is equal to or more than 20°.

7. The pneumatic tire according to claim 1, wherein an end of the rolled up carcass ply is in contact with the carcass ply.

* * * * *